(12) United States Patent
Kamal

(10) Patent No.: US 9,168,869 B1
(45) Date of Patent: Oct. 27, 2015

(54) VEHICLE WITH A MULTI-FUNCTION AUXILIARY CONTROL SYSTEM AND HEADS-UP DISPLAY

(71) Applicant: Sami Yaseen Kamal, Al-Shuhada (KW)

(72) Inventor: Sami Yaseen Kamal, Al-Shuhada (KW)

( * ) Notice: Subject to any disclaimer, the term of this patent is extended or adjusted under 35 U.S.C. 154(b) by 0 days.

(21) Appl. No.: 14/585,137

(22) Filed: Dec. 29, 2014

(51) Int. Cl.
  *H04N 7/18* (2006.01)
  *B60R 1/00* (2006.01)
  *G02B 27/01* (2006.01)

(52) U.S. Cl.
  CPC .............. *B60R 1/00* (2013.01); *G02B 27/0101* (2013.01); *H04N 7/181* (2013.01); *B60R 2300/105* (2013.01); *B60R 2300/205* (2013.01); *G02B 2027/014* (2013.01); *G02B 2027/0138* (2013.01); *G02B 2027/0141* (2013.01)

(58) Field of Classification Search
  USPC .......................................................... 348/148
  See application file for complete search history.

(56) References Cited

U.S. PATENT DOCUMENTS

| | | | |
|---|---|---|---|
| 5,010,437 A * | 4/1991 | Utsugi et al. ................... | 360/137 |
| 5,099,466 A * | 3/1992 | Kimura et al. .............. | 369/30.81 |
| H1109 H * | 10/1992 | Roberts et al. ..................... | 345/7 |
| 5,794,164 A * | 8/1998 | Beckert et al. ................ | 455/3.06 |
| 5,980,104 A * | 11/1999 | Haraguchi ................ | G01K 3/14 |
| | | | 250/332 |
| 6,240,347 B1 * | 5/2001 | Everhart et al. .................. | 701/36 |
| 6,539,358 B1 * | 3/2003 | Coon et al. ..................... | 704/275 |
| 6,868,170 B1 | 3/2005 | Fuku et al. | |
| 7,423,521 B2 * | 9/2008 | Kukita et al. .............. | 340/425.5 |
| 7,525,448 B1 * | 4/2009 | Wilson et al. ................. | 340/971 |
| 7,802,198 B2 | 9/2010 | Obradovich | |
| 8,255,144 B2 | 8/2012 | Breed et al. | |
| 8,447,845 B1 * | 5/2013 | Scott et al. ..................... | 709/220 |
| 8,648,912 B2 * | 2/2014 | Matsuda et al. .............. | 348/148 |
| 2004/0252993 A1 * | 12/2004 | Sato ............................... | 396/661 |
| 2005/0264433 A1 | 12/2005 | Yokokohji et al. | |
| 2005/0276447 A1 * | 12/2005 | Taniguchi et al. ............ | 382/103 |
| 2006/0043295 A1 * | 3/2006 | Satou et al. ..................... | 250/330 |
| 2006/0259210 A1 * | 11/2006 | Tanaka et al. ...................... | 701/1 |
| 2007/0247800 A1 * | 10/2007 | Smith et al. .................... | 361/683 |
| 2008/0077882 A1 * | 3/2008 | Kramer et al. ................ | 715/810 |
| 2008/0203308 A1 * | 8/2008 | Yoo ................................ | 250/352 |
| 2008/0218434 A1 * | 9/2008 | Kelly et al. ......................... | 345/8 |
| 2010/0179756 A1 | 7/2010 | Higgins et al. | |
| 2010/0265345 A1 | 10/2010 | Andersson | |

(Continued)

FOREIGN PATENT DOCUMENTS

JP      2004-284424     10/2004
WO    WO 2009/082360 A1    7/2009

*Primary Examiner* — Dave Czekaj
*Assistant Examiner* — Leron Beck
(74) *Attorney, Agent, or Firm* — Richard C. Litman

(57) ABSTRACT

The vehicle with a multi-function auxiliary control system and heads-up display includes a plurality of telematics units integrated into a road vehicle. Telematics units are connected to allow communication with an occupant of the vehicle, communication among the telematics units, and communication to a Smart heads-up display (HUD) positioned on the driver's side to project vehicle and environmental information onto the vehicle's windshield. The HUD projects the display image for heads-up view by the driver using either a reflector lens in back of, or a transparent film applied to, the windshield. Side view cameras and rear-facing radars are combined to alert the driver of blind spots of approaching vehicles from the rear. Forward-looking infra-red cameras are connected to the HUD to assist the driver's forward view under poor visibility conditions. A central controller in the vehicle assists driver input to the multi-function auxiliary control system devices.

17 Claims, 11 Drawing Sheets

(56) References Cited

U.S. PATENT DOCUMENTS

| | | |
|---|---|---|
| 2011/0093158 A1 | 4/2011 | Theisen et al. |
| 2012/0148105 A1* | 6/2012 | Burry et al. .................. 382/105 |
| 2012/0218125 A1* | 8/2012 | Demirdjian et al. .......... 340/905 |
| 2012/0229642 A1 | 9/2012 | Kilmer |
| 2012/0260164 A1* | 10/2012 | Scheufler et al. ............. 715/702 |
| 2013/0155236 A1* | 6/2013 | Ramdeo ........................ 348/148 |
| 2013/0229522 A1 | 9/2013 | Schofield et al. |
| 2014/0022068 A1 | 1/2014 | Usami |
| 2014/0070917 A1 | 3/2014 | Protopapas |
| 2014/0070932 A1 | 3/2014 | Prasad et al. |
| 2014/0070934 A1* | 3/2014 | Chau et al. .................... 340/438 |
| 2014/0071285 A1 | 3/2014 | Schofield et al. |
| 2014/0121883 A1 | 5/2014 | Shen et al. |
| 2014/0152697 A1 | 6/2014 | Shin |
| 2014/0240204 A1 | 8/2014 | Chen |
| 2014/0300743 A1 | 10/2014 | Kumon |

* cited by examiner

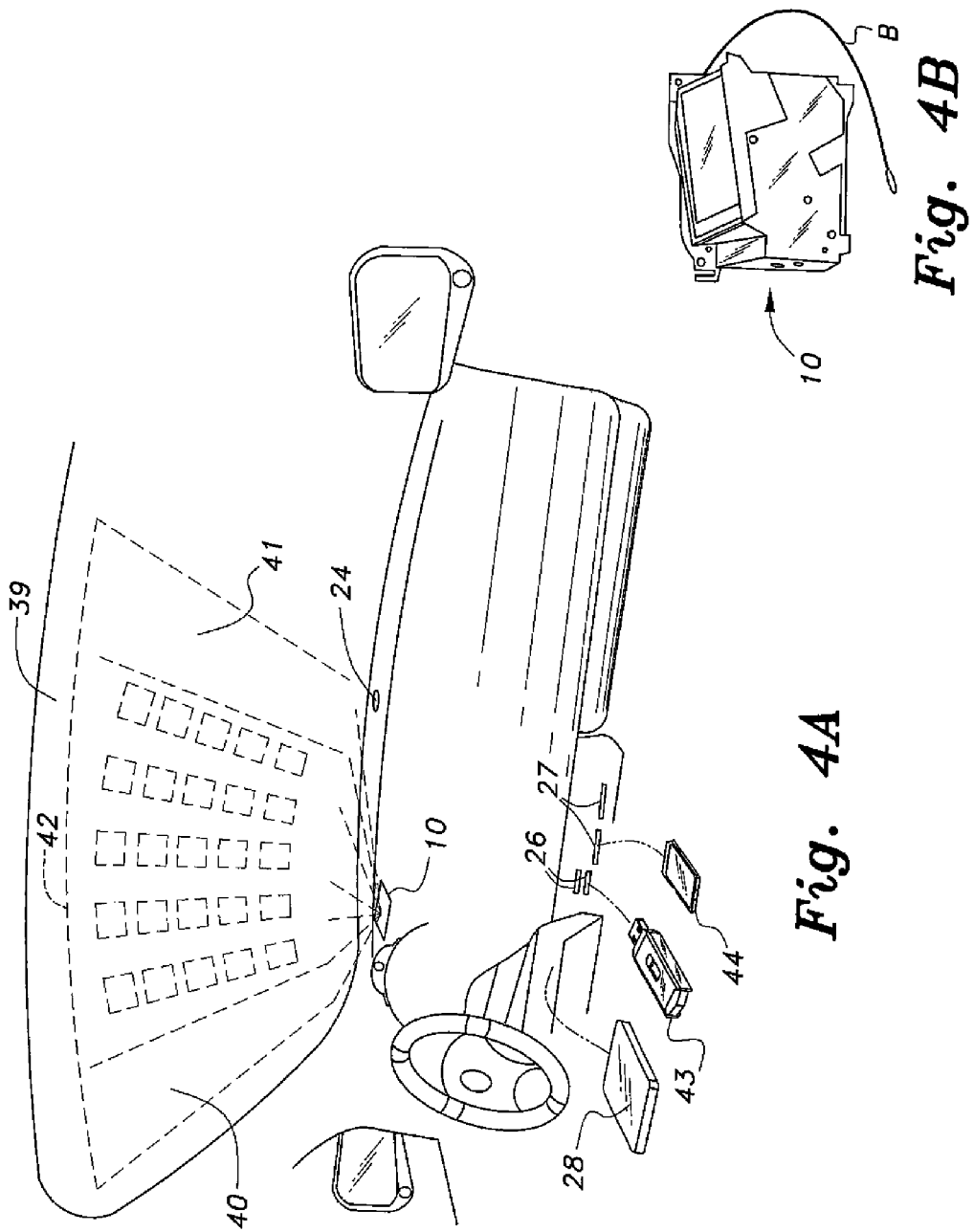

VEHICLE WITH A MULTI-FUNCTION AUXILIARY CONTROL SYSTEM AND HEADS-UP DISPLAY

BACKGROUND OF THE INVENTION

1. Field of the Invention

The present invention relates to vehicle control systems, and particularly to a vehicle with a multi-function auxiliary control system and heads-up display (HUD).

2. Description of the Related Art

Vehicle telematics relates to an interdisciplinary field encompassing telecommunications, vehicular technologies, road transportation, road safety, electrical engineering (sensors, instrumentation, wireless communications, etc.), computer science (multimedia, Internet, etc.), and may include the technology of sending, receiving and storing information via telecommunication devices in conjunction with affecting control on remote objects and the integrated use of telecommunications and informatics for application in vehicles and with control of vehicles on the move.

Telematics includes, but is not limited to, GPS technology integrated with computers and mobile communications technology in automotive navigation systems. Moreover, the term has evolved to refer to the use of such systems within road vehicles (hence the term "vehicle telematics").

To date, these vehicle telematics systems have been piecemeal and disparate. What is needed is an integrated vehicle telematics system that does not require any after-market or add-on products.

Thus, a vehicle with a multi-function auxiliary control system and heads-up display solving the aforementioned problems is desired.

SUMMARY OF THE INVENTION

The vehicle with a multi-function auxiliary control system and heads-up display includes a plurality of telematics units integrated into a road vehicle. Each telematics unit is connected to allow it to communicate with an occupant of the vehicle and to other telematics units, and to a Smart heads-up display (HUD) positioned on the driver's side to project vehicle and environmental information onto the vehicle's windshield. The HUD projects the display image for heads-up view by the driver using either a reflector lens in back of, or a transparent film applied to, the windshield. Side view cameras and rear-facing radars are combined to alert the driver of blind spots of vehicles approaching from the rear. Forward-looking infra-red cameras are connected to the HUD to assist the driver's forward view under poor visibility conditions. A central controller in the vehicle assists driver input to the multi-function auxiliary control system devices.

These and other features of the present invention will become readily apparent upon further review of the following specification and drawings.

BRIEF DESCRIPTION OF THE DRAWINGS

FIG. 4A is a schematic perspective view of the dashboard and windshield area of a vehicle with a multi-function auxiliary control system and heads-up display according to the present invention, shown with a USB stick, SIM card and motherboard exploded away from their housing/slots.

FIG. 4B is a detailed perspective view of the HUD (heads-up display) unit of a vehicle with a multi-function auxiliary control system and heads-up display according to the present invention.

Similar reference characters denote corresponding features consistently throughout the attached drawings.

DETAILED DESCRIPTION OF THE PREFERRED EMBODIMENTS

Figure 1:
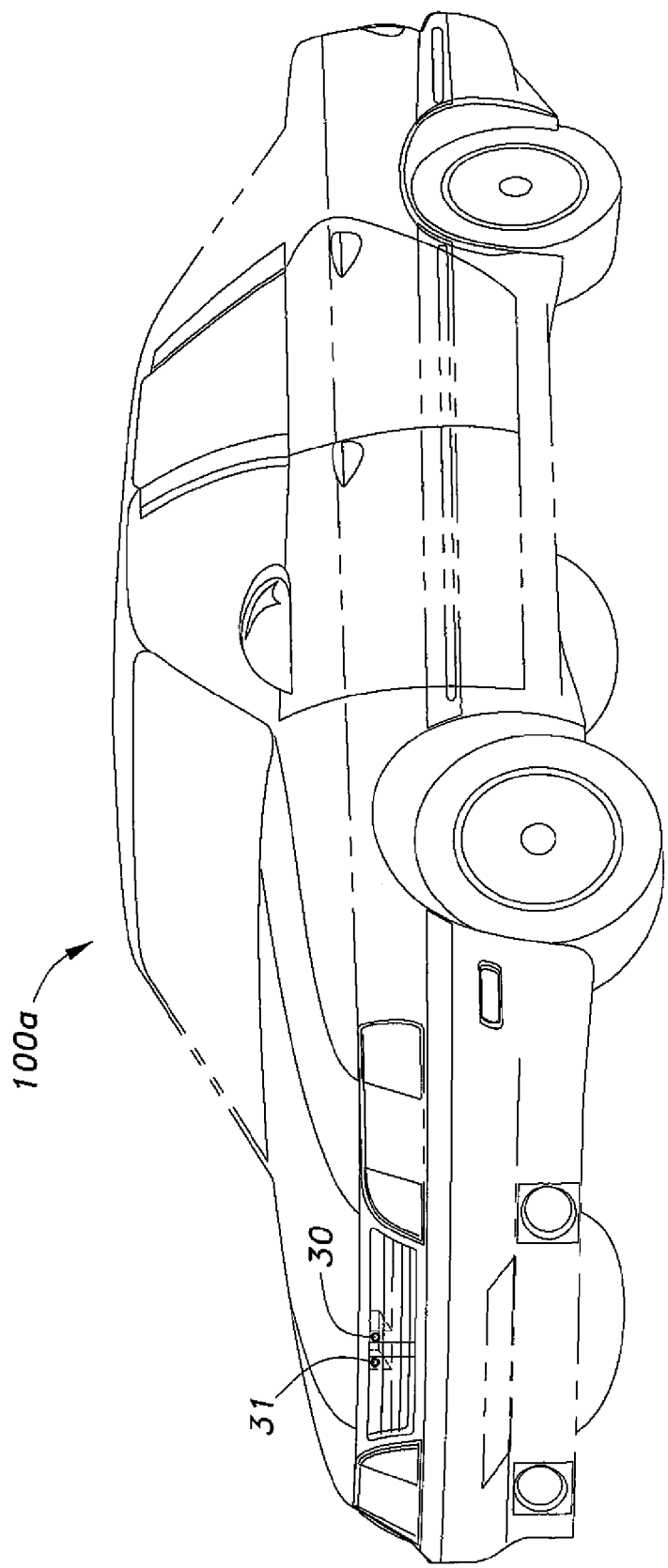
FIG. 1 is a perspective view of a vehicle with a multi-function auxiliary control system and heads-up display according to the present invention, the vehicle being equipped with front-facing IR cameras.
Figure 2:
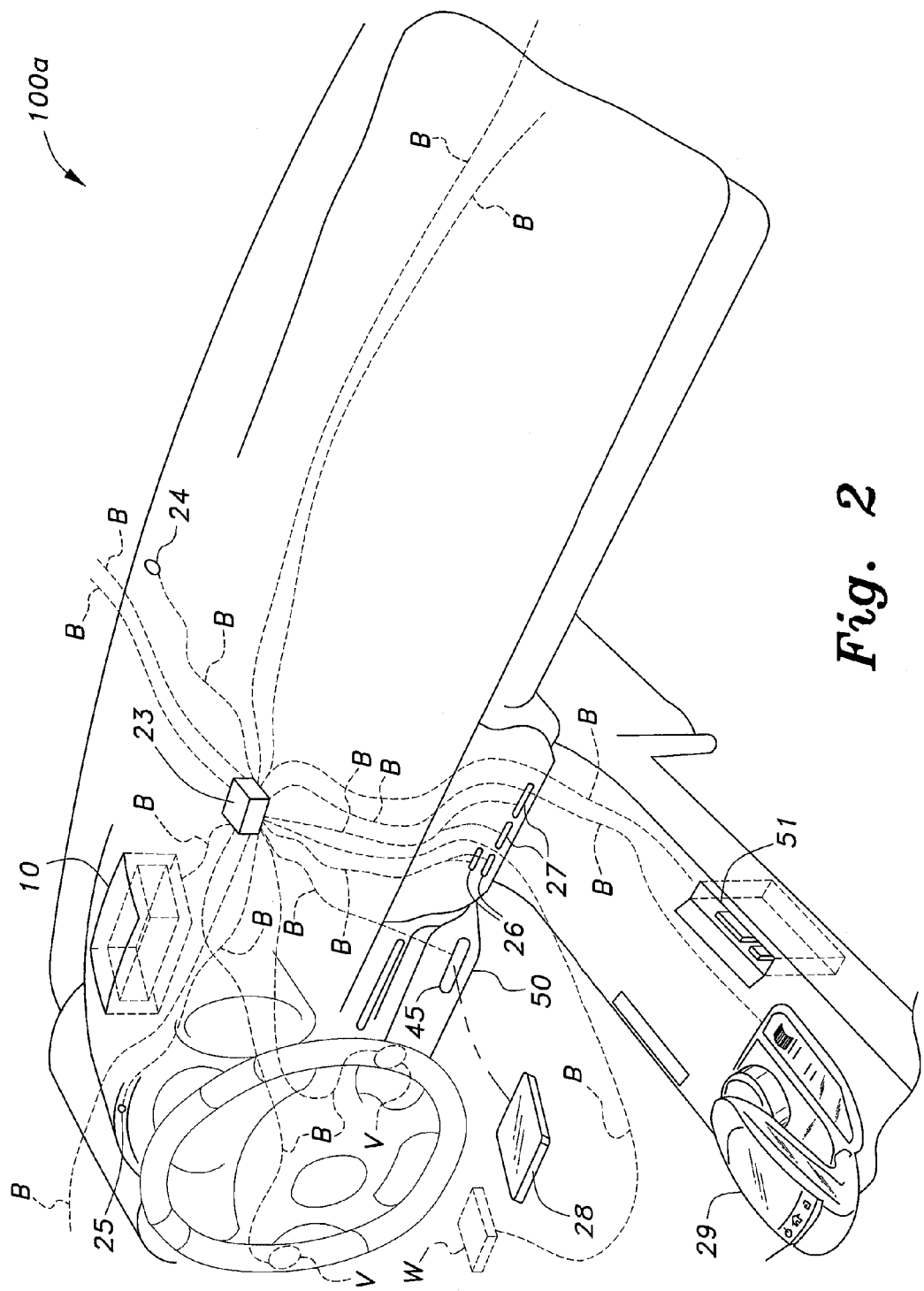
FIG. 2 is a partial perspective view of the interior of a vehicle with a multi-function auxiliary control system and heads-up display according to the present invention, showing the dashboard and console area.

The vehicle with a multi-function auxiliary control system and heads-up display, designated generally as 100b in the drawings, includes a plurality of telematics units (see FIG. 8) integrated into a vehicle 100a (see FIGS. 1 and 2). Typically, the vehicle 100a is an automobile or other street-legal road vehicle. Each telematics unit is connected in a manner that allows it to communicate with an occupant of the vehicle and to other telematics units, and to a Smart heads-up display (HUD) 10 positioned on the driver's side to project vehicle and environmental information onto the vehicle's windshield. FIG. 4B shows a detailed view of the HUD 10, The HUD 10 projects the display image for heads-up view by the driver using either a reflector lens in back of, or a transparent film applied to, the windshield, as known in the art. An optional passenger side HUD could be installed to display information pertinent to the passenger, such as passenger side climate controls or the like.

One objective of the vehicle with a multi-function auxiliary control system and heads-up display 100b is to increase driver awareness of the vehicle and its surroundings, while at the same time, allowing the driver to use a smart mobile device and/or PC applications that would be projected transparently on the front windshield via the Smart HUD 10. It is anticipated that this arrangement would lead to a decrease in car accident rates because the driver's gaze is still on the road while using the smart mobile device or PC applications. A mobile dock 51 is disposed along the center console of the vehicle and allows the smart mobile device to be connected to the multi-function auxiliary control system and heads-up display 100b for transparent projection of applications to the Smart HUD 10.

As shown in FIG. 2, the connection of devices, such as the mobile dock 51 and the HUD 10, is facilitated by bus-wire B, which also connects the interface device 23. The interface device 23 mediates communications among all of the devices connected via bus-wire B. It is contemplated that the vehicle with a multi-function auxiliary control system and heads-up display 100b may utilize any suitable hardware/software protocol, such as Ethernet, transmission control protocol/Internet protocol (TCP/IP), supervisory control and data acquisition (SCADA), controller area network (CAN), or the like to facilitate communications among the devices comprising the multi-function auxiliary control system and heads-up display 100b.

Upon starting the car 100a, the HUD display 10 will project onto the front windshield 39 a welcome message with the car's brand logo. This welcome message appears on main display 42, shown in FIG. 4A. Next, the logos of the operating systems to choose from are displayed on main display 42. Center controller 29 (shown in FIG. 3) is disposed on the vehicle's center console and, being connected via bus-wire B, gives the driver a means for manual input for access and control of the multi-function auxiliary control system and heads-up display 100b.

Figure 9:
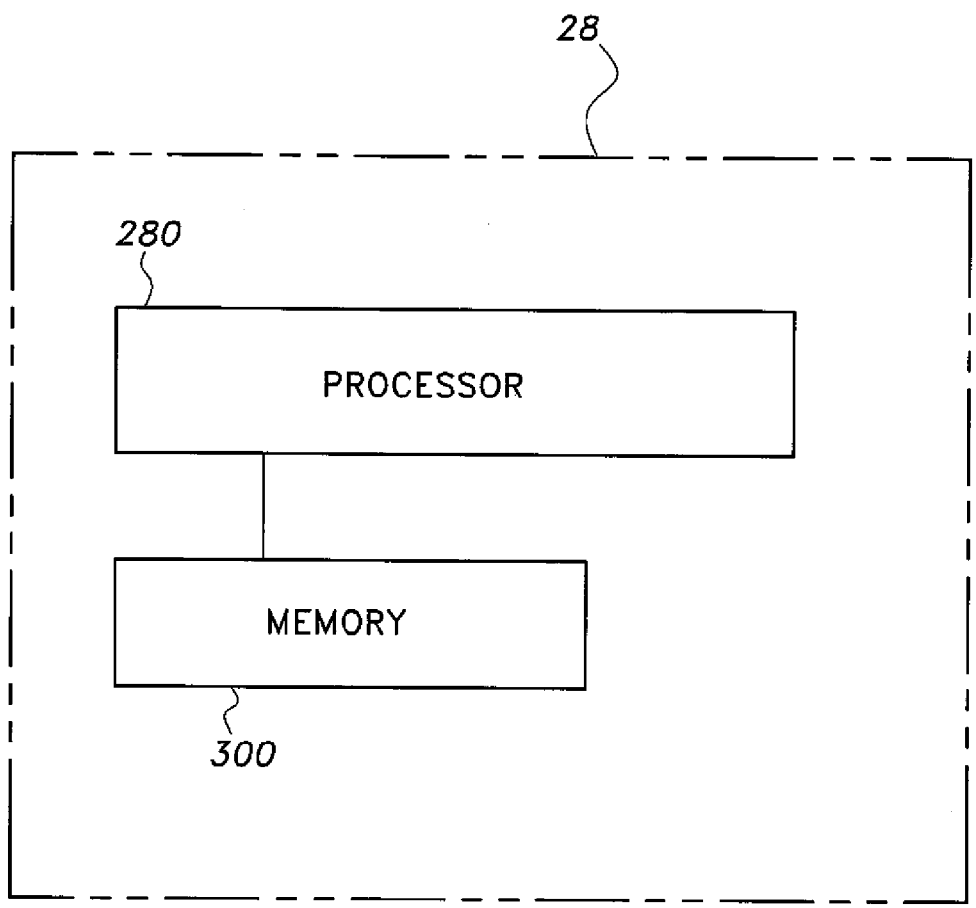
FIG. 9 is a block diagram of a motherboard for a vehicle with a multi-function auxiliary control system and heads-up display according to the present invention.

The vehicle occupant, e.g., the driver, may select which operating system to use via input at controller 29. Some of the operating system choices may require a fully operational computing system disposed on a motherboard. The motherboard 28, as shown in FIG. 9, includes at least a processor 280 connected to memory 300 to provide the fully operational computing system required by the selected operating system.

It is to be understood that a processing system, such as the exemplary processor 280 operable with memory 300, is a generalized system for implementing embodiments of apparatuses and methods for the multi-function auxiliary control system and heads-up display 100b, although it should be understood that the generalized processing system disposed on the motherboard 28 may represent, for example, a stand-alone computer, computer terminal, portable computing device, networked computer or computer terminal, or networked portable device.

The memory 300 is understood to represent computer readable memory in which data may be entered by the user and/or by devices operable on bus-wire B via any suitable type of interface. Additionally, the memory 300 may comprise flash memory, a solid-state disk drive, a hard disk drive, or any other memory type or combination of memory types. Calculations are performed by the processor 280, which may be any suitable type of computer processor, and may be displayed to the user on the display projected by HUD 10, for example.

Figure 5:
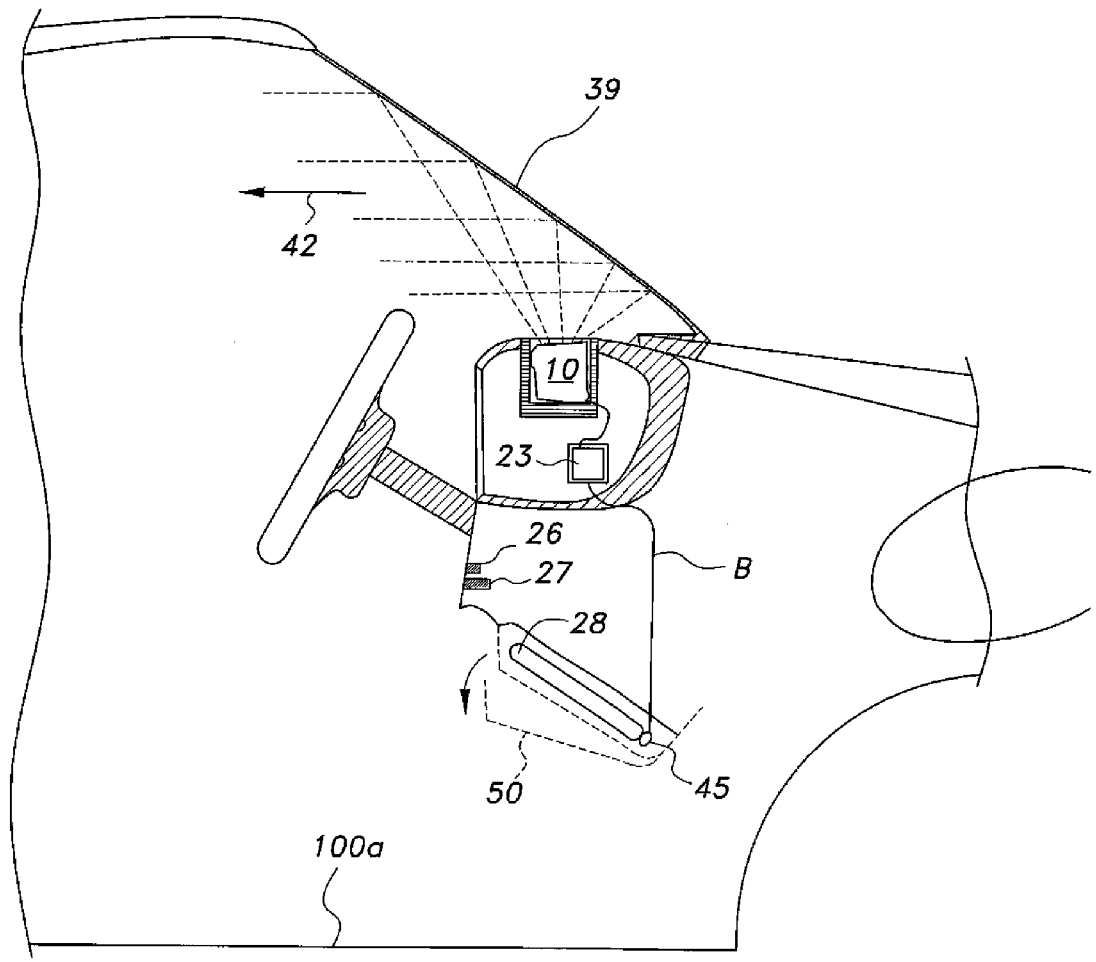
FIG. 5 is a partial side view in section of a vehicle with a multi-function auxiliary control system and heads-up display according to the present invention.

The motherboard 28 (shown also in FIGS. 2, 4 and 8) is removably connectable to the bus-wire B. A housing 50 in the dashboard of vehicle 100a supports the motherboard 28 and allows the motherboard 28 to be inserted for connection to the multi-function auxiliary control system and heads-up display 100b when required by the operating system chosen by the vehicle occupant. Preferably the housing is easily accessible to the driver for quick insertion and removal of the motherboard 28. The motherboard connector 45 (shown in FIG. 5) is disposed in a recess inside the motherboard housing 50 and connects to the bus-wire B. Optionally, there is a weight sensor (e.g., load cell) W in FIG. 2 housed in the driver's seat to measure the driver's weight while driving and connecting to a health application for medical purposes. This weight sensor is connected to the motherboard 28 via bus-wire B and interface device 23. In addition, two sensors V, in FIG. 2, installed in the steering wheel measure the vital statistics of the driver's body, such as, fat, heart rate, and the like. Sensors V are also connected to the motherboard 28 via bus-wire B and interface device 23. Data from the weight sensor and the sensors in the steering wheel are projected by the HUD 10 for easy viewing by the driver.

The center controller 29 (most clearly shown in FIG. 3B) is the main controller, and is disposed on the vehicle's center console. It includes a touch pad mouse 37, an On/Off button 34, a combination home button/fingerprint sensor 35, a back button 36, and a combination selection wheel and button 38. Alternatively, for left-handed people, the main controller 29 can be disposed on the driver's side, e.g., on the left side interior door panel.

Figure 3A:
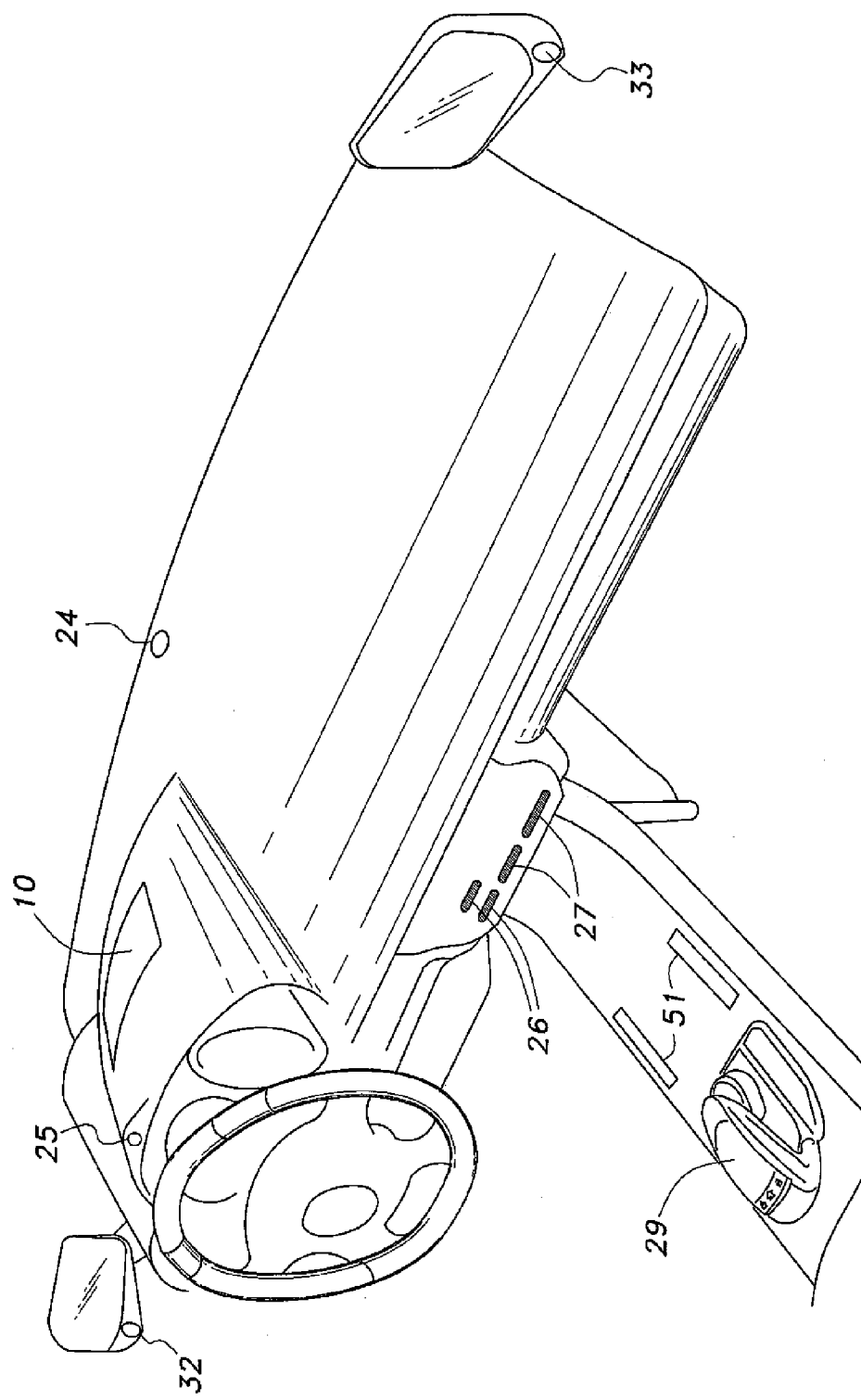
FIG. 3A is a partial perspective view of the interior of a vehicle with a multi-function auxiliary control system and heads-up display according to the present invention, showing camera, sensor, controller and slots.
Figure 3B:
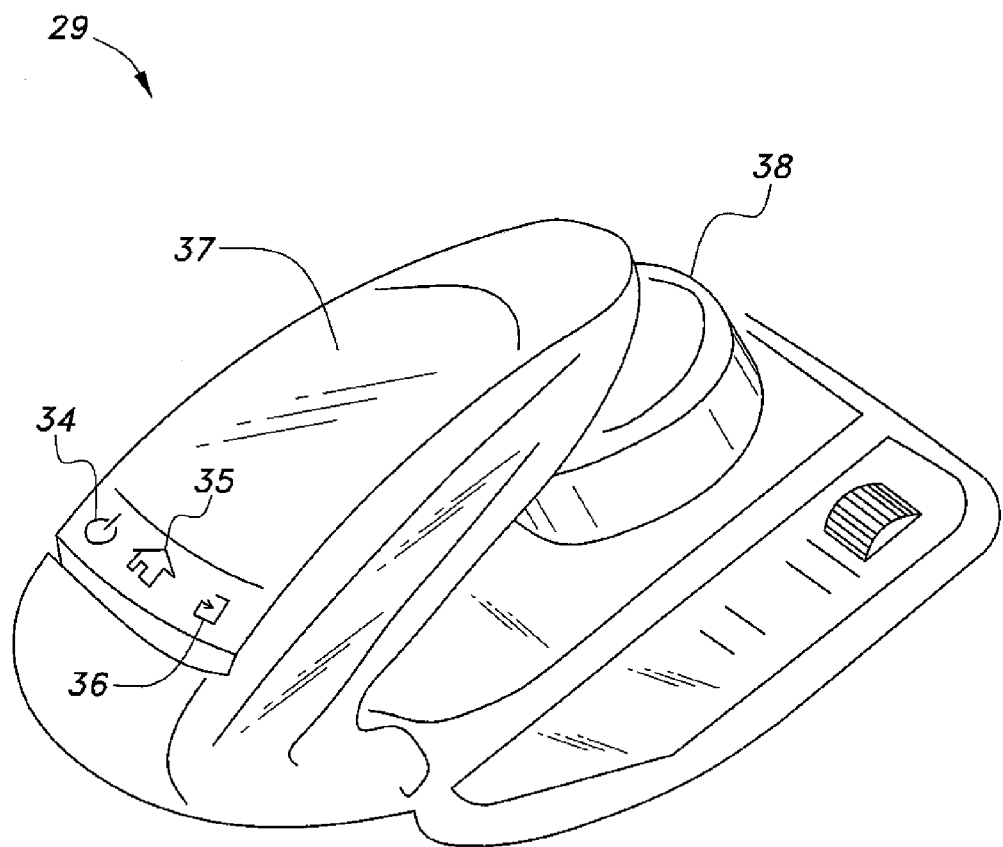
FIG. 3B is a perspective view of a controller for a multi-function auxiliary control system used in a vehicle with a multi-function auxiliary control system and heads-up display according to the present invention.

As shown in FIG. 3A, a web camera (web-cam) 25 is disposed in the vehicle's dashboard. Since typically a web-cam, such as web-cam 25, is also combined with a microphone with the appropriate application/operating system running, voice recognition/gesture recognition can be made available to help with controlling the telematics devices of the multi-function auxiliary control system and heads-up display 100b.

Moreover, it is contemplated that the voice recognition/gesture recognition feature may be embodied as a computer software product, comprising a non-transitory medium, e.g. memory 300, readable by a processor, e.g., processor 280, the non-transitory medium having stored thereon a set of instructions for implementing the voice recognition/gesture recognition feature.

As an example, the voice/gesture can direct maintenance information needed for the vehicle to appear on the display projected by the HUD 10. Moreover, a properly authenticated voice/gesture can control gauge information and status of, e.g., A/C, radio, fuel level, battery power level, headlight/taillight not working, locking/unlocking doors/trunk, sunroof, and the like, depending on the features that the vehicle and operating system provide. It should be understood that any type of visual information requested by the authenticated vehicle occupant can be displayed in a heads up manner using the HUD 10.

Figure 8:
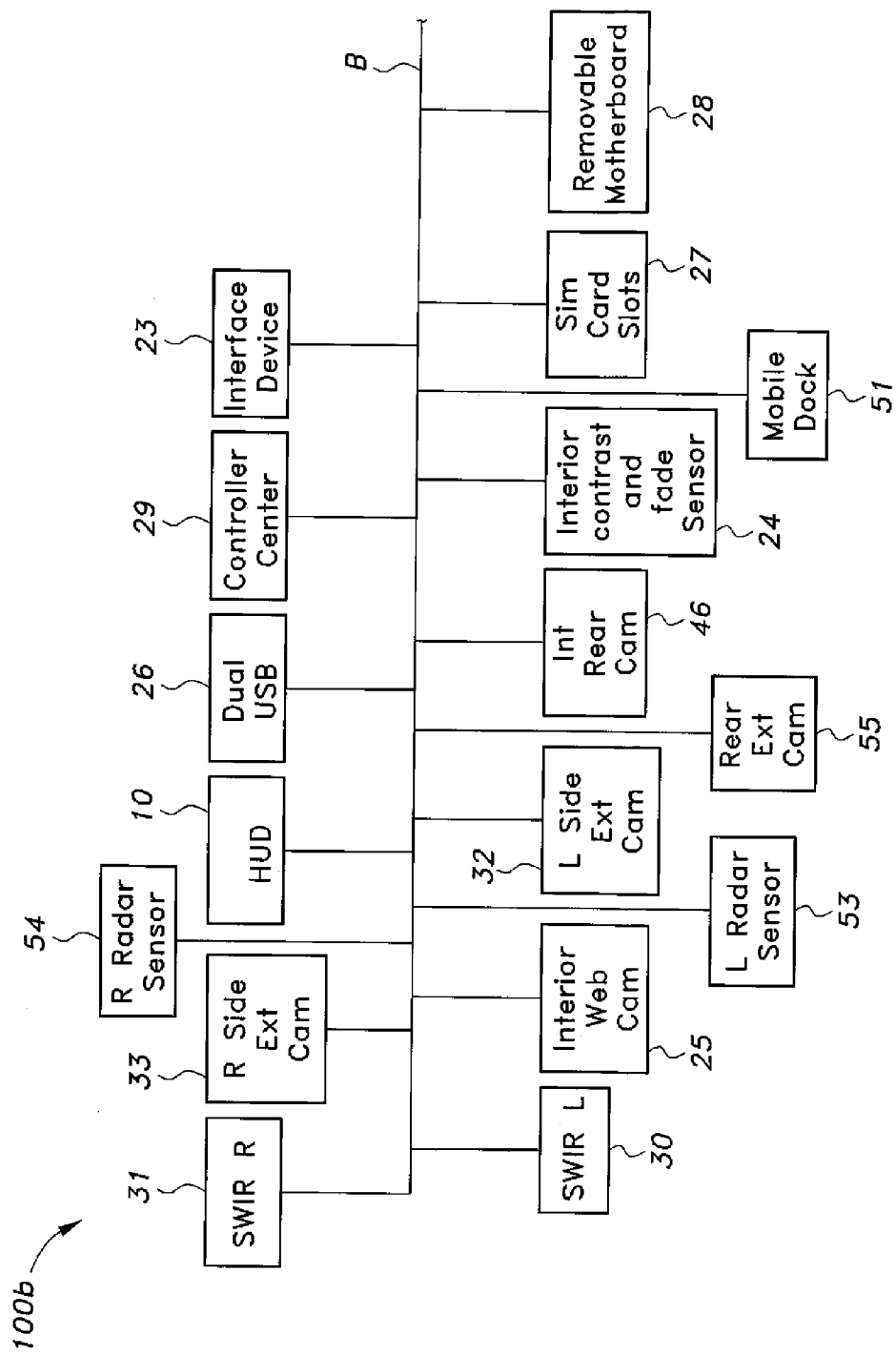
FIG. 8 is a block diagram of the multifunction auxiliary control system of a vehicle with a multi-function auxiliary control system and heads-up display according to the present invention.

As shown in FIG. 3A, two SIM card slots 27 are disposed in the center portion of the dashboard proximate to the vehicle's center console. One of the slots 27 may be adapted for data, while the remaining slots 27 may be adapted for making phone calls without a smart phone. These SIM card slots 27 (as shown in FIG. 8) are connected to the bus-wire B for total integration with the multi-function auxiliary control system and heads-up display 100b. As shown in FIG. 4A, a SIM card 44 can fit in one of the two SIM card slots 27. Moreover, it should be understood that the SIM card slots 27 may interface with a wireless telecommunications system aboard the vehicle 100a, the wireless telecommunications system being based on any number of standards, including, but not limited to, GSM EDGE, UMTS, CDMA2000, DECT, WiMAX, or the like.

Proximate the two SIM card slots 27 are two USB slots 26. The two USB slots 26 are connected to the bus-wire B for total integration with the multi-function auxiliary control system and heads-up display 100b to store parameters of the multi-function auxiliary control system. As shown in FIG. 4A, USB media 43 can fit in either one of the two USB slots 26.

As shown in FIG. 1, left- and right-side external front short wave infrared (SWIR) cameras 30, 31, respectively, are disposed in the front grill of vehicle 100a to capture a forward looking environment surrounding the vehicle 100a, and, as shown in FIG. 8, are connected to the bus-wire B for total integration with the multi-function auxiliary control system and heads-up display 100b.

Figure 7:
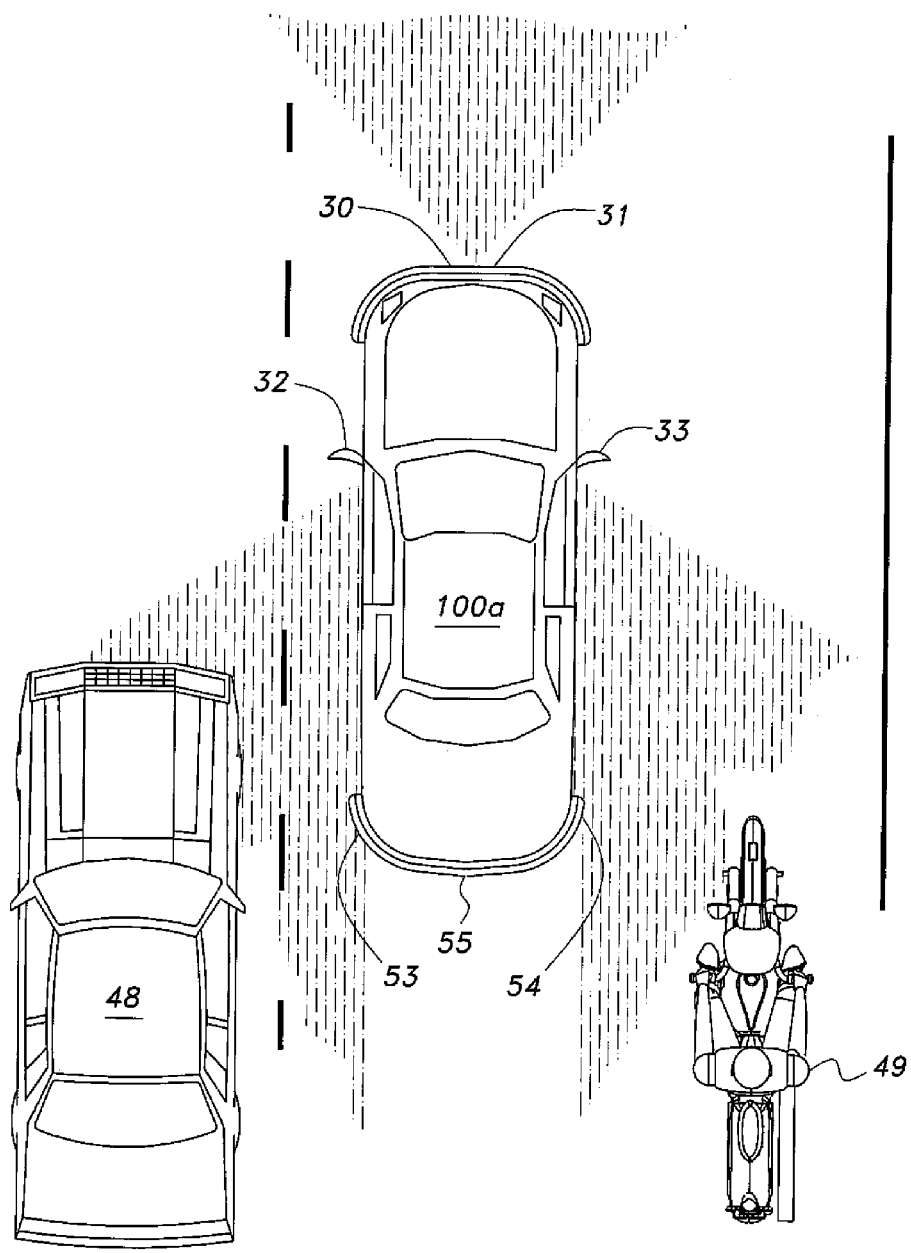
FIG. 7 is an environmental top plan view showing coverage areas of the sensors and cameras of a vehicle with a multi-function auxiliary control system and heads-up display according to the present invention.

As shown in FIG. 3A, left external side camera 32 is disposed in the left side view mirror housing under the left exterior side mirror. Similarly, right external side camera 33 is disposed in the right side view mirror housing under the right exterior side mirror, and, as shown in FIG. 8, both cameras 32 and 33 are connected to the bus-wire B for total integration with the multi-function auxiliary control system and heads-up display 100b. As shown in FIG. 7, the vehicle 100a is also equipped with external rear-facing left 53 and right 54 radar sensors, which are disposed in the left and right rear portions of the vehicle, and, as shown in FIG. 8, are connected to the bus-wire B for total integration with the multi-function auxiliary control system and heads-up display 100b. The side cameras 32 and 33 are programmed to work in combination with the radar sensors 53 and 54 in that the side cameras 32 and 33 can alert the driver about vehicles approaching the blind spot after an object or a car is sensed by one or both of the radar sensors 53, 54, and will selectively appear on the left-side display portion 40 or the right-side display portion 41 of the HUD display projection shown in FIG. 4A. The side cameras 32 and 33 will turn off automatically when the radar sensors 53, 54 no longer indicate approaching objects from the rear. FIG. 7 is a top plan view illustrating the co-functionality of radar sensors 53 and 54 with the side cameras 32 and 33 when objects 48 and 49 approach the vehicle 100a from the rear. This co-functionality of the side cameras 32 and 33 with the radar sensors 53 and 54 is also helpful while parking. Moreover, it is contemplated that the co-functionality of the side cameras 32 and 33 with the radar sensors 53 and 54 may be embodied as a computer software product, comprising a non-transitory medium, e.g. memory 300, readable by a processor, e.g., processor 280, the non-transitory medium having stored thereon a set of instructions for implementing the co-functionality of the side cameras 32 and 33 with the radar sensors 53 and 54.

As shown in FIG. 7, vehicle 100a is equipped with an external rear camera 55 disposed in the rear portion of the vehicle and connected to the bus-wire B for total integration with the multi-function auxiliary control system and heads-up display 100b. The rear camera 55 operates when the transmission of the vehicle 100a is in reverse. The view from the rear camera 55 is projected onto the main display 42 (shown in FIG. 4A).

Figure 6A:
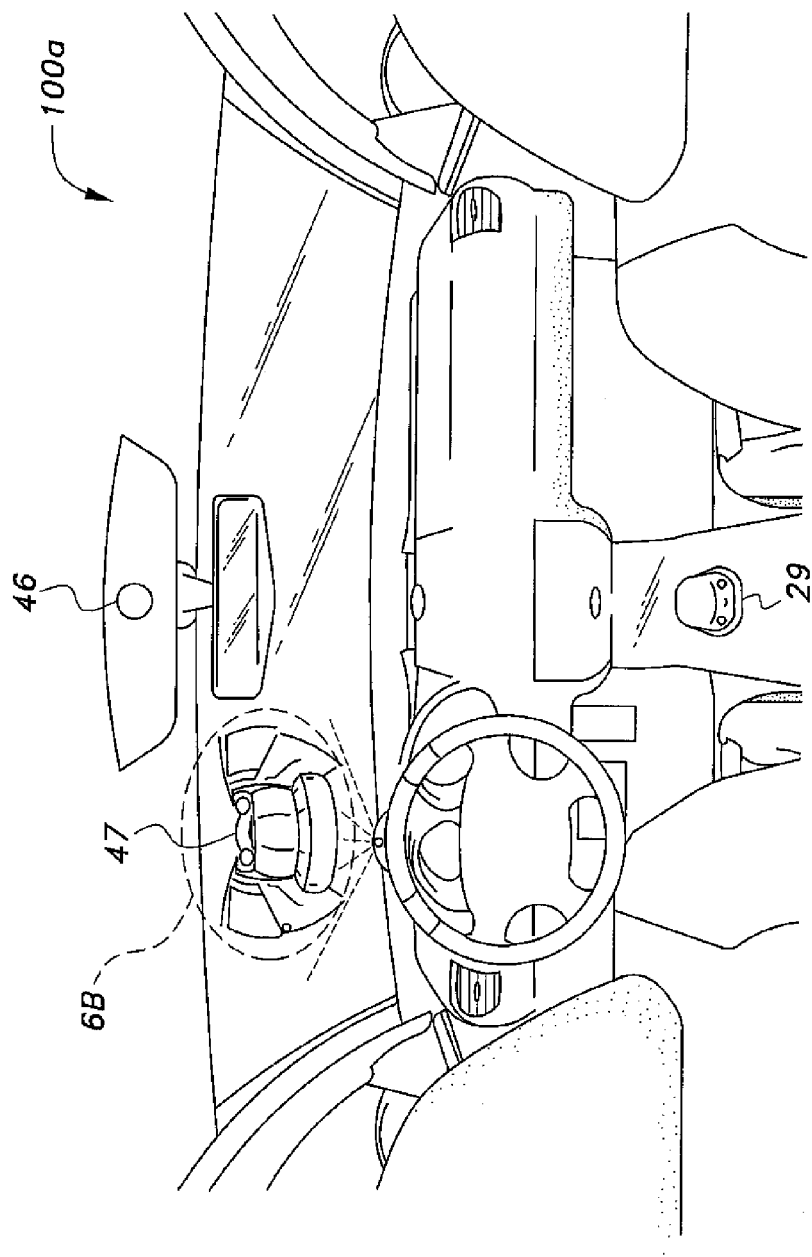
FIG. 6A is a perspective view illustrating the HUD display of the rear of a vehicle with a multi-function auxiliary control system and heads-up display according to the present invention as seen from the interior rear-facing camera.
Figure 6B:
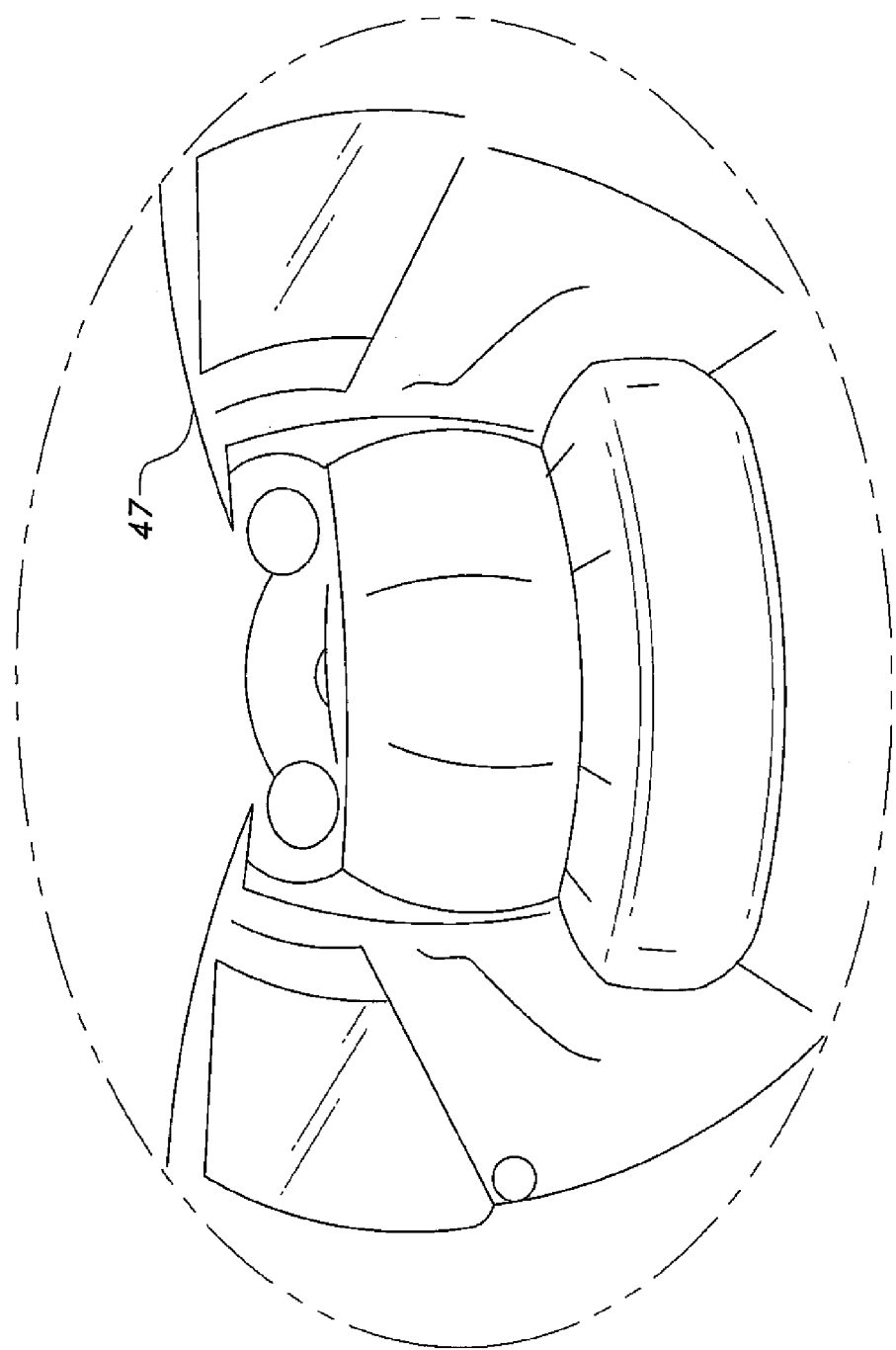
FIG. 6B is a detail view of area 6B of FIG. 6A.

As shown in FIGS. 6A and 6B, an internal camera 46 is mounted above the dashboard of vehicle 100a. As shown in FIG. 8 the internal camera 46 is connected to the bus-wire B for total integration with the multi-function auxiliary control system and heads-up display 100b. This rear-facing internal camera 46 may be adapted for viewing of the rear seat and surrounding rear interior portions of vehicle 100a using the main display projected by the HUD 10.

As shown in FIG. 2, an interior contrast and fade sensor 24 is disposed on the upper portion of the dashboard of the vehicle 100a. As shown in FIG. 8, the interior contrast and fade sensor 24 is connected to the bus-wire B for total integration with the multi-function auxiliary control system and heads-up display 100b. The interior contrast and fade sensor 24 is operably connected to the Smart HUD 10 to adjust the clarity and transparency of the Smart HUD 10 according to lighting conditions inside the vehicle 100a.

While computer processing of functions of the multi-function auxiliary control system and heads-up display 100b has been described as taking place utilizing motherboard 28 with processor 280 and memory 300 disposed thereon, it is contemplated that computer processing of the functions of the multi-function auxiliary control system and heads-up display 100b may also be located in any of the devices connected to bus-wire B, or distributed among the devices connected to the bus-wire B shown in FIG. 8.

It is to be understood that the present invention is not limited to the embodiments described above, but encompasses any and all embodiments within the scope of the following claims.

I claim:

1. A vehicle with a multi-function auxiliary control system and heads-up display, comprising:
    a road vehicle having an exterior portion, an interior portion, an exterior front, an exterior rear, a dashboard, and a center console in the interior portion, and left and right exterior side mirrors disposed on left and right sides of the vehicle's exterior portion;
    first and second cameras disposed on the exterior front of the road vehicle, the first and second cameras capturing a forward-looking environment surrounding the road vehicle;
    a heads-up display disposed inside the road vehicle, the heads-up display projecting an electronic display of the forward-looking environment surrounding the road vehicle captured by the cameras;
    a housing disposed in the dashboard, the housing being easily accessible to a driver of the road vehicle;
    a plurality of sensors disposed in the vehicle for measuring multiple parameters of the driver for collecting vital statistics of the driver;
    a processor and memory motherboard removably disposed in the housing, the processor and memory motherboard being operably connected to control display features of the heads-up display when the processor and memory motherboard is disposed in the housing;
    wherein each of the plurality of sensors operatively coupled to the processor and motherboard for including the vital statistic data to the driver via the heads-up display; and
    a center controller disposed on the center console of the road vehicle, the center controller having a touch pad mouse, an ON/Off button, a combination home button/fingerprint sensor, a back button, and a combination selection wheel and button for manual input by the driver to control the heads-up display and the multi-function auxiliary control system.

2. The vehicle with a multi-function auxiliary control system and heads-up display according to claim 1, wherein the first and second cameras are short wave infrared cameras.

3. The vehicle with a multi-function auxiliary control system and heads-up display according to claim 1, further comprising an interface device disposed in the interior portion of the road vehicle, the interface device being operably connected to the multi-function auxiliary control system, the interface device mediating communications among devices in the multi-function auxiliary control system.

4. The vehicle with a multi-function auxiliary control system and heads-up display according to claim 1, further comprising a mobile dock disposed along the center console of the road vehicle, the mobile dock being operably connected to the heads-up display, the mobile dock being adapted for receiving a smart mobile device and connecting the smart mobile device to the multi-function auxiliary control system and the heads-up display for transparent projection of smart mobile device applications by the heads-up display.

5. The vehicle with a multi-function auxiliary control system and heads-up display according to claim 1, further comprising an interior contrast and fade sensor disposed in the interior portion of the road vehicle, the interior contrast and fade sensor being operably connected to the heads-up display to adjust the clarity and transparency of the heads-up display according to lighting conditions inside the road vehicle.

6. The vehicle with a multi-function auxiliary control system and heads-up display according to claim 1, further comprising:
 a first SIM card slot disposed in the interior portion of the road vehicle and operably connected to a wireless data communications system in the road vehicle; and
 a second SIM card slot disposed in the interior portion of the road vehicle and operably connected to a wireless voice communications system in the road vehicle.

7. The vehicle with a multi-function auxiliary control system and heads-up display according to claim 1, further comprising:
 a first USB media slot disposed in the interior portion of the road vehicle, the first USB media slot being operably connected to the multi-function auxiliary control system and heads-up display to store parameters of the multi-function auxiliary control system; and
 a second USB media slot disposed in the interior portion of the road vehicle, the second USB media slot being operably connected to the multi-function auxiliary control system and heads-up display to store parameters of the multi-function auxiliary control system.

8. The vehicle with a multi-function auxiliary control system and heads-up display according to claim 1, further comprising an internal camera mounted inside the interior portion of the road vehicle, the internal camera being operably connected to the heads-up display for viewing of a rear seat and surrounding rear interior portions of the road vehicle.

9. The vehicle with a multi-function auxiliary control system and heads-up display according to claim 1, further comprising a web camera disposed in the interior portion of the road vehicle, the web camera being operably connected to the multi-function auxiliary control system to provide voice/gesture control of the multi-function auxiliary control system and heads-up display.

10. The vehicle with a multi-function auxiliary control system and heads-up display according to claim 1, further comprising an external rear camera disposed in the exterior rear portion of the road vehicle, the external rear camera being operably connected to the multi-function auxiliary control system and heads-up display for heads-up display projected display of objects to the rear of the road vehicle when the road vehicle has a transmission in reverse gear.

11. The vehicle with a multi-function auxiliary control system and heads-up display according to claim 1, further comprising:
 a left-side exterior camera disposed in a housing of the left exterior side mirror; and
 a right-side exterior camera disposed in a housing of the right exterior side mirror, the left- and right-side exterior cameras being operably connected to the multi-function auxiliary control system and the heads-up display.

12. The vehicle with a multi-function auxiliary control system and heads-up display according to claim 11, further comprising external rear-facing left and right radar sensors disposed in the exterior rear portion of the road vehicle, the external rear-facing left and right radar sensors being operably connected to the multi-function auxiliary control system and the heads-up display for warning of approaching objects from the rear of the road vehicle.

13. The vehicle with a multi-function auxiliary control system and heads-up display according to claim 12, further comprising:
 means for selectively activating the side cameras to alert the driver about vehicles approaching a blind spot when an object has been sensed by either of the radar sensors; and
 means for transmitting a side view as seen by the side cameras to the heads-up display for a projected display of the side view.

14. The vehicle with a multi-function auxiliary control system and heads-up display according to claim 13, further comprising means for automatically turning off the selectively activated side cameras when the radar sensors no longer indicate approaching objects from the rear.

15. The vehicle with a multi-function auxiliary control system and heads-up display according to claim 1, wherein the road vehicle comprises a windshield and a driver's seat, the heads-up display projecting an electronic display of images detected by cameras and sensors connected to the multi-function auxiliary control system onto the windshield in front of the driver's seat, whereby a driver may view the images while simultaneously looking through the windshield.

16. The vehicle with a multi-function auxiliary control system and heads-up display according to claim 1, wherein the plurality of sensors include a weight sensor disposed seat for the driver, and a pair of sensor disposed in the steering wheel.

17. A system for improving the operability and control of a vehicle, the vehicle having an exterior portion, an interior portion, an exterior front, an exterior rear, a dashboard, a windshield and a seat for a driver, and a center console in the interior portion, and left and right exterior side mirrors disposed on left and right sides of the exterior portion, the system comprising:
 an input module, a processor module, and a display module;
 the input module including a plurality of input devices, the plurality of input devices selected from the group consisting of:
 a weight sensor for collecting the weight of the driver;
 a pair of sensors disposed on the steering wheel for collecting health data of the driver;
 first and second short wave infrared cameras disposed on the exterior front of the vehicle, the first and second short wave infrared cameras capturing a forward-looking environment surrounding the vehicle;
 an external rear camera disposed in the exterior rear portion of the vehicle, the external rear camera capturing a rearward-looking environment surrounding the vehicle;
 an interior contrast and fade sensor disposed in the interior portion of the vehicle;
 an internal camera mounted inside the interior portion of the vehicle;
 a left-side exterior camera disposed in a housing of the left exterior side mirror; and
 a right-side exterior camera disposed in a housing of the right exterior side mirror;
 external rear-facing left and right radar sensors disposed in the exterior rear portion of the vehicle;
 wherein the input module monitors and provides exterior environmental information about the vehicle; and
 the processor module including a plurality of components, the plurality of components selected from the group consisting of:

an interface device disposed in the interior portion of the vehicle, the interface device mediating communications among the devices of the input module;
a first SIM card slot;
a second SIM card slot;
a first USB media slot;
a second USB media slot;
a web camera disposed in the interior portion of the vehicle for collecting images about the interior environment of the vehicle;
a processor and memory motherboard removably disposed in the housing, the processor and memory motherboard being operably connected to the interface for receiving a collection of data input from the components of the input module; and
a center controller disposed on the center console of the vehicle for providing an auxiliary control of the system in the vehicle, the center controller having a touch pad mouse, an on/off button, a combination home button/fingerprint sensor, a back button a combination selection wheel and button for manual input, and a mobile dock disposed along the center console of the vehicle;

wherein the processing module processes the exterior environmental information, and generates a collection of reproduction images of the environment about the vehicle; and
the display module consisting of:
a heads-up display disposed inside the vehicle, the heads-up display including a means for projecting an electronic display of images onto the windshield in front of the seat for the driver; and
a housing disposed in the dashboard, the housing being easily accessible to a driver of the vehicle;
wherein receives the collection of reproduction images of the exterior and interior environments about the vehicle and displays the images upon the windshield in front of the seat for the driver;
whereby a driver may view the images while simultaneously looking through the windshield while the heads-up display projects an electronic display of the environment surrounding the vehicle captured by the input module.

* * * * *